United States Patent [19]
Callan

[11] 3,777,253
[45] Dec. 4, 1973

[54] LOW POWER LOSS VOLTAGE SUPPLY CIRCUIT

[75] Inventor: John E. Callan, Milwaukee, Wis.

[73] Assignee: Allen-Bradley Company, Milwaukee, Wis.

[22] Filed: Oct. 24, 1972

[21] Appl. No.: 299,999

[52] U.S. Cl. .............................. 323/22 T, 307/240
[51] Int. Cl. .............................................. G05f 1/40
[58] Field of Search ................... 323/22 T; 307/240

[56] References Cited
UNITED STATES PATENTS

| | | | |
|---|---|---|---|
| 3,323,034 | 5/1967 | Dubin et al. | 323/22 T X |
| 3,505,583 | 4/1970 | Burkhardt et al. | 323/22 T |
| 3,548,294 | 12/1970 | Houghton | 323/22 T X |
| 3,374,424 | 3/1968 | Wiechmann | 323/22 T |
| 3,513,378 | 5/1970 | Kemper | 323/22 T |

Primary Examiner—William M. Shoop, Jr.
Attorney—Arthur H. Seidel et al.

[57] ABSTRACT

A low power loss, direct current power supply has a pair of D.C. feed lines and a first electrical switch that transmits direct current from the feed lines to an energy storage element feeding the output of the power supply. A first voltage responsive current gate is across the energy storage element, and a second voltage responsive current gate is joined to the circuit of the first gate to control a second electrical switch for shunting of the first switch.

3 Claims, 2 Drawing Figures

PATENTED DEC 4 1973　　　　　　　　　　　　　　　3,777,253

LOW POWER LOSS VOLTAGE SUPPLY CIRCUIT

BACKGROUND OF THE INVENTION

The present invention relates to D.C. power supplies for providing well regulated voltages derived from A.C. sources, and in which the D.C. output voltage is reduced in value from the A.C. input voltage.

With the advent of solid state devices and the miniaturization they permit, there has been an increasing demand for smaller, direct current power supplies that has not been satisfactorily met. Heretofore, there have primarily been two types of direct current supplies available. The most common type employs a transformer to reduce an A.C. source voltage to appropriate levels. While this type of supply is efficient, there is a limitation in how small such a supply can be produced that is primarily determined by the size of the transformer used. The second most common type of direct current supply presently available employs a resistive element, such as a dropping resistor or the like, for reducing the voltage supplied by the source. Power supplies of this type have the disadvantages of relatively low efficiency and high heat dissipation in the form of undesirable losses.

Although both of the aforementioned supplies are reliable methods for supplying a low D.C. voltage from a high voltage source, they cannot be packaged in small, minimal weight containers having only a limited space for components and limited ability to dissipate heat. The present invention provides a power supply that meets the requirement of compact size and it overcomes the problem of high losses.

SUMMARY OF THE INVENTION

The invention resides in a direct current power supply circuit having D.C. feed lines that provide a source of electrical power, an electrical switching element that transmits D.C. current from the feed lines to an energy storage element, a timing network that turns the switching element on and off in response to circuit voltages, and output lines extending from the energy storage element.

In a preferred form of the invention, the timing network has a first branch in parallel with the energy storage element that comprises a Zener diode and a voltage developing resistance. The timing network also has a second branch that connects between the Zener diode and the voltage developing resistor and includes a diac which in turn controls a solid state shunting switch. The shunting switch functions to turn off the switching element that transmits current to the energy storage element. The first branch, comprising the Zener diode and voltage developing resistance, acts in conjunction with the energy storage device to insure that output voltage does not drop below a predetermined minimum. To prevent the output voltage from exceeding a predetermined maximum, the second branch of the timing circuit is connected to the first branch, and the diac is actuated to conduct when a predetermined breakdown voltage appears across the voltage developing resistance of the first branch. The function of the diac is to cause the shunting switch to conduct and thereby turn off the electrical switching element that feeds the energy storage element. Once the diac begins conducting, it remains in this state until the voltage level across the voltage developing resistance of the first branch falls a set amount below the diac breakdown voltage. This operational characteristic of the timing circuit provides a hysteresis effect that permits the output to swing between selected maximum and minimum values.

The circuit of power supply of this invention, as described above, reduces a D.C. voltage at the D.C. feed lines to a lower value required by a load fed from the power supply. This reduction is accomplished in a fashion that the output voltage is maintained within a narrow range, and to further smooth the final output a regulating network may form the final output stage of the power supply. In making a controlled reduction in output level, the D.C. voltage appearing at the D.C. feed lines may be of a sharply pulsating nature, and the action of the circuit will handle this pulsation to develop a relatively well controlled output value.

It is an object of the present invention to provide a direct current supply that is small and compact, so that it can be packaged in a small, minimum weight container.

It is another object to provide a direct current voltage supply that has low power loss and is therefore efficient and economical to operate.

The foregoing and other objects and advantages of the invention will appear from the following description. In the description reference is made to the accompanying drawings, which form a part hereof, and in which there is shown by way of illustration, and not of limitation, a specific form in which the invention may be embodied. Such embodiment does not represent the full scope of the invention, but rather the invention may be employed in a variety of embodiments, and reference is made to the claims herein for interpreting the breadth of the invention.

DESCRIPTION OF THE PREFERRED EMBODIMENT

Figure 1:
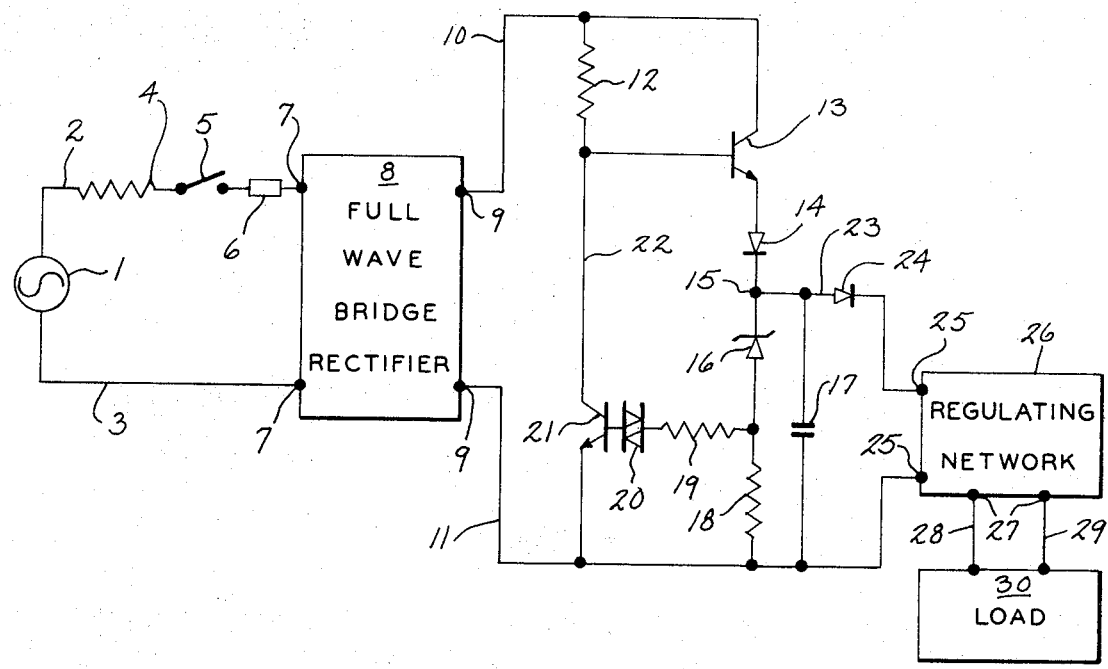
FIG. 1 is a schematic diagram of a preferred embodiment of a power supply of the invention.

Referring to FIG. 1, the power supply circuit includes a relatively high voltage A.C. power source 1 that connects with input lines 2 and 3. Connected in series in the line 2 are a current limiting resistor 4, a switch 5, and a fuse 6, and the lines 2 and 3 connect with two input terminals 7 of a full-wave, bridge rectifier 8. The rectifier 8 may be of any suitable known type to provide a direct current to the remainder of the circuit. Connected to output terminals 9 of the rectifier 8 are a D.C. feed line 10 that serves as a positive line and a D.C. feed line 11 that serves a negative or ground line. The line 10 has a common connection with one side of a high resistance biasing resistor 12 and the collector of a NPN transistor 13 that serves as a first electrical switching element. The base of the transistor 13 is connected to the other side of the resistor 12, and connected to the emitter of the transistor 13 is the anode of a blocking diode 14.

The cathode of the diode 14 has a common connection at a node 15 with several circuit elements. The first element is the cathode of a Zener diode 16 which serves as a first voltage responsive gating device. The anode of the Zener diode 16 is connected to one side of a voltage developing resistor 18 which has its other side connected to the negative D.C. feed line 11. The Zener diode 16 and resistor 18 form the first branch of a timing circuit, to be hereinafter described, and connected in parallel with this first branch is a capacitor 17 that acts as an energy storage element. The last element connected to the node 15 is an output line 23 that leads to the output of the supply.

Connected to the first branch of the timing circuit, at a point between the anode of the diode 16 and the resistor 18, is a current limiting resistor 19 which leads to a diac 20. The diac 20 serves as a second voltage responsive gating device, and it is connected to the base of a second NPN transistor 21 that functions as a second electrical switching element. The resistor 19 and the diac 20 form a second branch of the timing circuit, such circuit thus being formed of two branches in a T-connection.

Connected to the collector of the transistor 21 is a line 22 that has a common connection with the base of the first transistor 13 and the biasing resistor 12. The emitter of the transistor 21 is connected to the negative line 11, and the transistor 21 may be deemed a shunting switch which shunts biasing current from the first switching element 13, as hereinafter described.

The output line 23 has a blocking diode 24 connected at its cathode with one of two input terminals 25 for a regulating network 26, employed to regulate the output voltage appearing across the line 23 and the line 11. The line 11 is connected to the other input terminal 25 of the network 26, and functions as an output line for the energy storage element 17. Connected to output terminals 27 of the network 26 are two output lines 28 and 29 which lead to a load 30.

The circuit of FIG. 1 operates in the following manner. Upon the closure of the switch 5 alternating current is supplied by the source 1 to the full-wave rectifier 8. This current is transformed by the full-wave rectifier 8 into a pulsating direct current, a portion of which flows through the biasing resistor 12 and the base-emitter junction of the transistor 13 to saturate the transistor 13. As a result, there is a low impedance path through the collector-emitter junction of the transistor 13, and a correspondingly large current flow therethrough to the diode 14.

The purpose of the diode 14 is to prevent a reverse current flow back toward the transistor 13, and the diode 14 thus acts as a conventional blocking diode. Current flow from the transistor 13 forward biases the diode 14, and passes through to the node 15 and the several elements joined in common to this node. Since the Zener diode 16 of the first branch of the timing circuit is a voltage responsive gating device that requires an actuation voltage exceeding a predetermined magnitude to be in a conductive state, current flow from the diode 14 does not initially flow through that branch. Instead, the current from the diode 14 flows to the capacitor 17, which begins to charge rapidly. The Zener diode 16 is preferably chosen to have a reverse bias breakdown voltage equal to approximately one-half the desired output voltage of the power supply. When the voltage across the capacitor 17 equals the breakdown voltage of the Zener diode 16, current begins to flow through the first branch of the timing circuit. In response to the flow of current through this branch, the resistor 18 acts as a voltage developing device. The capacitor 17 continues to charge, so that its voltage equals the voltage across both the Zener diode 16 and the resistor 18. Immediately after breakdown of the Zener diode 16, current is prevented from passing through the second branch of the timing circuit, formed of the resistor 19 and diac 20, by the diac 20 which has a Zener diode breakdown characteristic. Breakdown of the diac 20 occurs only when the voltage across the resistor 18 reaches a predetermined level, which preferably is chosen to equal approximately the total output voltage required by the load 30. This means that the sum of the voltages across the Zener diode 16 and the resistor 18 will equal one and one-half times the voltage required by the load 30 when the diac 20 begins to conduct.

Subsequent to breakdown of the diac 20, resistance of the diac falls and the voltage required to maintain the diac 20 in a conducting state is substantially less than its breakdown voltage, so that an adequate flow of current through the diac 20 results and is maintained. This current flows through the base-emitter junction of the shunting transistor 21, rapidly saturating the transistor 21 so that it turns on hard. With the transistor 21 saturated, the biasing current for the transistor 13 that flows through the resistor 12 is shunted through the line 22 and the transistor 21 to the negative line 11. Without this biasing current, conduction through the collector-emitter junction of the transistor 13 is cut off, and no additional current is supplied through the diode 14 to the node 15. Consequently the capacitor 17 begins to discharge through the first branch of the timing circuit and also through the resistor 19 and diac 20 of the second timing branch. This discharge causes the capacitor voltage to decrease. However, the capacitor 17 does not discharge below a minimum voltage that is less than the desired voltage required by the load 30, because the Zener diode 16 is selected to have a higher breakdown voltage than the difference between the voltage required to break down the diac 20 and the voltage at which the diac 20 turns off. Accordingly, before the voltage level across the Zener diode 16 and the resistor 18 drops below the voltage required by the load 30, the diac 20 will stop conducting, which in turn cuts off the switching transistor 21. This action reestablishes the biasing of the transistor 13, so that it switches back into its saturated conducting state, and charging of the capacitor 17 begins again.

In this way, the switching transistors 13 and 21 alternately switch on and off, causing the voltage potential across the capacitor 17 to range between a level equal to the output voltage required by the load 30 and one and one-half times that output voltage level. The timing circuit primarily controls this fluctuation of the voltage potential across the capacitor 17. The difference between the voltage required to break down the diac 20 and the voltage that is thereafter required to maintain it in a conductive state controls the switching of the transistors 13 and 21 so that the voltage across the capacitor 17 swings between minimum and maximum levels. Thus, the diac 20 provides what is, in effect, a hysteresis action, but the use of the diac 20 for this purpose is not essential since it may be replaced by other components that are known by those skilled in the art to operate in similar fashion. By maintaining the charge of the capacitor 17 above a predetermined minimum level, it is insured that the output voltage of the supply will be sufficient to meet the requirements of the load 30. Low power dissipation is achieved by the switching of the transistor 13 on and off in order that when the charge of the capacitor 17 reaches its maximum level, source current is no longer supplied to elements connected at the node 15. Instead, the current through the resistor 12 is shunted through the transistor 21 to the ground line 11. Because the resistor 12 is large in value, the current flowing therethrough is small and the amount of power dissipated by shunting biasing current to the line 11 is relatively minor.

Figure 2:
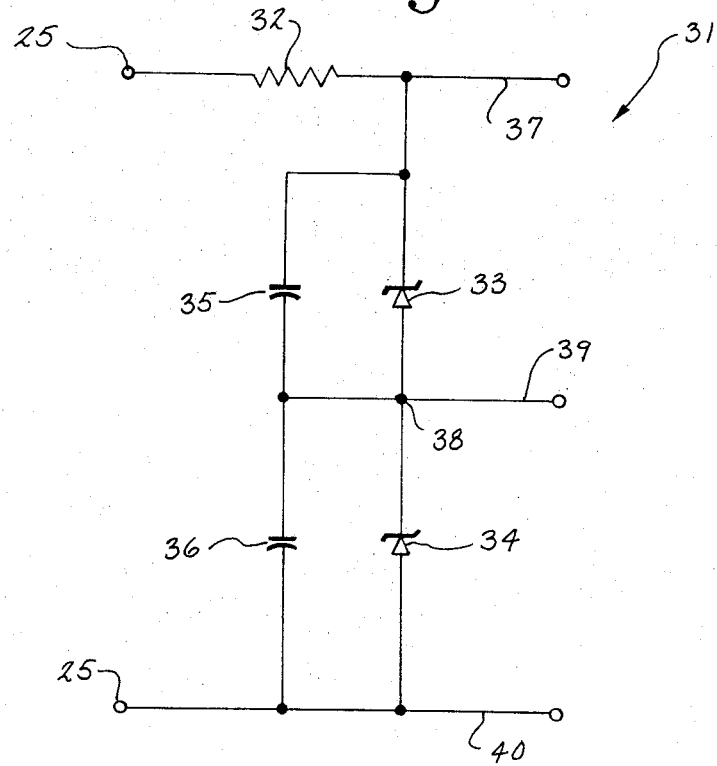
FIG. 2 is a schematic diagram of a voltage regulating network that may be employed as a part of the power supply of FIG. 1.

The voltage across the capacitor 17 may be used to directly drive the load 30, but due to the fluctuation of voltage across the capacitor 17, the regulating network 26 is normally employed with the supply to smooth out this fluctuation. The design of the network 26 may be of any standard known type that will provide the degree of regulation desired for the load 30. The network 26 has two output leads, and an alternative example is the circuit 31, shown in FIG. 2, which may provide extremely fine voltage regulation, as well as being ideally suited for use with loads such as operational amplifiers because it provides both negative and positive output voltages in contrast to the network 26, which provides only a negative or a positive voltage, but not both.

The regulating network 31 has the input terminals 25, and consists of a resistor 32, Zener diodes 33 and 34, and capacitors 35 and 36. One side of the resistor 32 connects to one of the terminals 25 and serves as a dropping resistor to dissipate excess voltages supplied to the network 31. The other side of the resistor 32 has a common connection with a first output line 37, the cathode of the diode 33 and one plate of the capacitor 35. The other plate of the capacitor 35 and the anode of the diode 33 have a common connection at node 38, placing the diode 33 and capacitor 35 in a parallel relationship. A second output line 39 leads from the node 38. Also connected to the node 38 are the cathode of the diode 34 and one plate of the capacitor 36. The anode of the diode 34 and the other plate of the capacitor 36 are also connected together so that they form a second diode-capacitor parallel combination to connect with a third output line 40. By designating the output line 39 as a ground line for the network 31, the lines 37 and 40 will respectively constitute positive and negative outputs relative to the line 39.

The Zener diodes 33 and 34 are the primary regulating components of the network 31, and are chosen so that their breakdown voltages summed together equal the total output voltage desired across the lines 37 and 40. If the voltage supplied to the network 31 by the power supply exceeds the total output voltage desired, the Zener diodes 33 and 34 will allow a current flow increase therethrough sufficient so that the excess voltage is dissipated by the resistor 32, If a voltage of one-half the total output voltage is desired across each of the pairs of lines 37, 39 and 39, 40 the Zener diodes 33 and 34 are each chosen to have a breakdown voltage equal to one-half the total output voltage. Thus, this arrangement would provide equal relatively positive and relatively minus voltages for driving operational amplifiers or the like. The capacitors 35 and 36 are employed to maintain proper output voltage levels at times when the load connected across the output lines temporarily draws an increased amount of power.

Thus, the present invention as shown and described provides a D.C. power supply that has low power loss and is composed of components that may be contained in relatively small, minimum weight containers. By the employment of the timing circuit, including the diac 20, the flow of current through the transistor 13 is controlled so that the charge across the capacitor 17 is maintained within minimum and maximum limits. When the capacitor 17 has reached its maximum charge, the shunting to ground of the biasing current for the transistor 13 through the high resistance 12 makes the power loss of the circuit minimal. Thus, operation is efficient and no special requirements must be met to dissipate unwanted energy, as in instances where dropping resistors are employed to reduce the available voltage to desired levels for the output. Further, bulky transformers for obtaining a voltage reduction are eliminated so that the complete circuit is relatively small in physical size.

I claim:

1. In a d-c power supply having an input terminal at which a d-c voltage level is generated, circuit means for generating a reduced d-c voltage level at a circuit output terminal, the combination comprising:

a first electronic switch having a first load current conducting element connected to said input terminal, a second load current conducting element connected to said output terminal, and a control element;

bias current supply means connected to said control element to supply current thereto which drives said first electronic switch into a fully conductive state;

an energy storage element connected to said second load current carrying element to receive and store electrical energy when said first electronic switch is fully conductive and to develop a voltage which is proportional thereto;

a voltage responsive gating device connected to said energy storage element and being operable to generate signal current when the voltage developed by said energy storage element reaches a preset maximum level and to discontinue generation of said signal current when said voltage diminishes to a second, preset minimum level; and a second electronic switch having a control element connected to said voltage responsive gating device and a current conducting element connected to said bias current supply means, wherein said second electronic switch is operable to divert bias current from the control element of said first electronic switch when signal current is received from said voltage responsive gating device to thereby drive said first electronic switch into a non-conductive state in which no energy is supplied to said energy storage element, and wherein said second electronic switch is operable to allow bias current to flow to said first electronic switch control element when said signal current is not received from said voltage responsive gating device.

2. The circuit as recited in claim 1 in which said voltage responsive gating device is a diac which connects to said energy storage element through a voltage divider branch.

3. The circuit as recited in claim 2 in which said second electronic switch is a transistor and said voltage divider branch includes a series connected zener diode and resistor.

* * * * *